US010977597B2

(12) United States Patent
Bruno et al.

(10) Patent No.: US 10,977,597 B2
(45) Date of Patent: Apr. 13, 2021

(54) SYSTEM AND METHOD FOR VALIDATING DATA

(71) Applicant: Innovian Corporation, Bryan, TX (US)

(72) Inventors: Bill Bruno, Chicago, IL (US); Adam McArdell, Davenport, IA (US); Kevin Wysocki, Denver, CO (US)

(73) Assignee: Innovian Corporation, Bryan, TX (US)

( * ) Notice: Subject to any disclaimer, the term of this patent is extended or adjusted under 35 U.S.C. 154(b) by 134 days.

(21) Appl. No.: 15/221,414

(22) Filed: Jul. 27, 2016

(65) Prior Publication Data
US 2017/0032305 A1 Feb. 2, 2017

Related U.S. Application Data

(60) Provisional application No. 62/197,439, filed on Jul. 27, 2015.

(51) Int. Cl.
*G06Q 10/06* (2012.01)
(52) U.S. Cl.
CPC .............. *G06Q 10/06395* (2013.01)
(58) Field of Classification Search
None
See application file for complete search history.

(56) References Cited

U.S. PATENT DOCUMENTS 5,740,354 A * 4/1998 Ben-Natan .......... G06F 11/0718
714/45
5,790,779 A * 8/1998 Ben-Natan .......... G06F 11/0775
714/39

(Continued)

FOREIGN PATENT DOCUMENTS

| WO | WO-2004079544 A2 * | 9/2004 | ............ G06Q 30/02 |
| WO | WO-2009051939 A2 * | 4/2009 | ............ G06Q 30/02 |
| WO | WO-2014159899 A2 * | 10/2014 | ........... H04L 67/025 |

OTHER PUBLICATIONS

Likarish, Peter, Eunjin Jung, and Insoon Jo. "Obfuscated malicious javascript detection using classification techniques." 2009 4th International Conference on Malicious and Unwanted Software (MALWARE). IEEE, 2009. (Year: 2009).*

(Continued)

*Primary Examiner* — Matthew S Gart
*Assistant Examiner* — Derick J Holzmacher
(74) *Attorney, Agent, or Firm* — Houda El-Jarrah; Thomas E. La Grandeur; Bold IP, PLLC

(57) ABSTRACT

A system for validating data includes a digital touch point associated with an organization having an element and a quality assurance (QA) module for monitoring the digital touch point. The system includes a quality control (QC) algorithm associated with the QA module, which is executed against the new element to determine if one or more discrepancies exist between current data for the new element and expected data for the new element. The system includes a tangible error report that is generated by the QA module. The tangible error report captures the one or more discrepancies between the current data and the expected data for the new element. The QA module has the ability to modify the request to call to eliminate the one or more discrepancies.

19 Claims, 10 Drawing Sheets

(56) References Cited

U.S. PATENT DOCUMENTS

| | | | |
|---|---|---|---|
| 7,461,297 B2 | 12/2008 | McLellan et al. | |
| 7,725,574 B2* | 5/2010 | O'Connell | G06F 11/0781 709/224 |
| 7,861,213 B2* | 12/2010 | Wang | G06F 9/451 717/100 |
| 7,890,814 B2* | 2/2011 | Zhang | G06F 11/366 714/45 |
| 8,161,498 B2* | 4/2012 | Atkin | G06F 9/454 719/320 |
| 8,261,362 B2 | 9/2012 | Goodwin et al. | |
| 8,578,482 B1* | 11/2013 | Yang | G06F 21/51 726/22 |
| 8,706,871 B2* | 4/2014 | Wiener | G06F 40/14 709/224 |
| 8,874,970 B2* | 10/2014 | Benedek | G06F 11/0709 714/38.11 |
| 9,003,423 B1* | 4/2015 | Rodriguez Valadez | G06F 9/542 719/310 |
| 2001/0032248 A1* | 10/2001 | Krafchin | G06Q 10/107 709/206 |
| 2004/0107387 A1* | 6/2004 | Larsson | G06F 11/0775 714/39 |
| 2007/0174419 A1* | 7/2007 | O'Connell | G06F 11/0775 709/217 |
| 2007/0240225 A1 | 10/2007 | Shrader et al. | |
| 2008/0034404 A1* | 2/2008 | Pereira | H04L 63/12 726/2 |
| 2008/0126869 A1* | 5/2008 | Kraft | G06F 21/55 714/37 |
| 2008/0155340 A1* | 6/2008 | Tsun | G06F 16/93 714/38.14 |
| 2008/0320343 A1* | 12/2008 | Eickmeyer | G06F 11/0781 714/57 |
| 2009/0006883 A1* | 1/2009 | Zhang | G06F 11/366 714/1 |
| 2009/0094175 A1* | 4/2009 | Provos | G06F 21/564 706/12 |
| 2009/0100154 A1* | 4/2009 | Stevenson | G06Q 30/02 709/220 |
| 2009/0327865 A1* | 12/2009 | Li | G06F 16/00 715/234 |
| 2010/0218053 A1* | 8/2010 | Eickmeyer | G06F 11/3676 714/57 |
| 2011/0035486 A1* | 2/2011 | Seolas | G06F 11/3692 709/224 |
| 2011/0041090 A1* | 2/2011 | Seolas | G06F 11/3688 715/771 |
| 2011/0066908 A1* | 3/2011 | Bartz | G06F 11/0709 714/746 |
| 2011/0093773 A1* | 4/2011 | Yee | G06F 16/9577 715/235 |
| 2011/0119220 A1* | 5/2011 | Seolas | G06F 16/957 706/47 |
| 2011/0173698 A1* | 7/2011 | Polyakov | G06F 11/0748 726/23 |
| 2011/0276843 A1* | 11/2011 | Echevarria | G06F 11/0781 714/55 |
| 2012/0204068 A1* | 8/2012 | Ye | G06F 11/0769 714/57 |
| 2013/0055042 A1* | 2/2013 | Al Za'noun | G06Q 10/06395 714/746 |
| 2013/0124532 A1* | 5/2013 | McQuarrie | G06F 40/106 707/748 |
| 2014/0059219 A1* | 2/2014 | Seolas | H04L 43/0876 709/224 |
| 2014/0108139 A1* | 4/2014 | Weinstein | G06Q 30/02 705/14.53 |
| 2014/0136944 A1* | 5/2014 | Harris | G06F 40/103 715/234 |
| 2014/0143606 A1 | 5/2014 | Eickmeyer et al. | |
| 2014/0189864 A1* | 7/2014 | Wang | G06F 21/51 726/23 |
| 2014/0280012 A1* | 9/2014 | Feuerlein | G06F 16/9566 707/709 |
| 2014/0281902 A1* | 9/2014 | Feuerlein | G06F 16/958 715/234 |
| 2014/0283041 A1* | 9/2014 | Cao | G06F 21/563 726/22 |
| 2014/0317489 A1* | 10/2014 | Lal | G06F 40/14 715/234 |
| 2014/0344232 A1* | 11/2014 | Kludy | G06F 40/174 707/694 |
| 2015/0095721 A1* | 4/2015 | Beskrovny | G06F 16/954 714/48 |
| 2015/0128263 A1* | 5/2015 | Raugas | H04L 63/1433 726/23 |
| 2015/0193402 A1* | 7/2015 | Ayoub | G06F 40/14 715/234 |
| 2016/0078078 A1* | 3/2016 | Seolas | G06F 16/7867 707/687 |
| 2017/0063653 A1* | 3/2017 | Kieviet | G06F 11/3466 |
| 2017/0230258 A1* | 8/2017 | Pestana | H04L 67/02 |

OTHER PUBLICATIONS

Balasundaram, Prabavathy, Amrita Ramadoss, and Manju Muthaiya. "IE browser compatibility for web applications." ACM SIGWEB Newsletter Autumn (2012): 1-15. (Year: 2012).*

"Firebug" downloaded on http://getfirebug.com/errors; Aug. 19, 2014, pp. 1-4.

* cited by examiner

Example Report 1: Data Layer Errors

| Invalid Value | Data Layer Variable | Date Layer Errors | Sessions Impacted | Tags Impacted |
|---|---|---|---|---|
| Incorrect case | affinity_group | 989 | 972 | 1 |
| | page_name | 754 | 743 | 1 |
| | store_locator_country | 677 | 670 | 1 |
| Incorrect format | coupon_id | 3,421 | 3,361 | 3 |
| | rewards_member | 1,132 | 1,130 | 1 |
| | store_locator_results_returned | 1,995 | 1,872 | 1 |
| | store_locator_state | 2,003 | 1,992 | 1 |
| Missing Product ID | product_filters | 1,083 | 1,077 | 1 |
| | products_in_cart | 1,316 | 1,293 | 2 |
| No value | banner_ad_name | 7 | 3 | 1 |
| | site_section | 690 | 663 | 1 |
| | store_locator_zip | 456 | 421 | 1 |
| | user_id | 1,089 | 1,074 | 1 |

FIG. 3A

Example Report 2: Data Layer Errors by Page URL

| Page URL | Data Layer Variable | Data Layer Errors | Sessions Impacted | Tags Impacted |
|---|---|---|---|---|
| www.samplesite.com/bath | site_section | 690 | 663 | 1 |
| www.samplesite.com/checkout/my-cart | coupon_id | 3,421 | 3,361 | 3 |
| | products_in_cart | 1,316 | 1,293 | 2 |
| www.samplesite.com/home | banner_ad_name | 7 | 3 | 1 |
| | rewards_member | 1,132 | 1,130 | 1 |
| www.samplesite.com/kitchen/cookware/pans | page_name | 754 | 743 | 1 |
| www.samplesite.com/kitchen/mixers/hand-mixers | product_filters | 1,083 | 1,077 | 1 |
| www.samplesite.com/log-in | user_id | 1,089 | 1,074 | 1 |
| www.samplesite.com/myaccount/user-preferences | affinity_group | 989 | 972 | 1 |
| www.samplesite.com/store-locator | store_locator_country | 677 | 670 | 1 |
| | store_locator_results_returned | 1,995 | 1,872 | 1 |
| | store_locator_state | 2,003 | 1,992 | 1 |
| | store_locator_zip | 456 | 421 | 1 |

FIG. 3B

Example Report 3: Tags Impacted

| Tag Name | Data Layer Variable | Tags Impacted | Sessions Impacted |
|---|---|---|---|
| Adobe Analytics | coupon_id | 1 | 362 |
| | products_filters | 1 | 1,077 |
| | products_in_cart | 1 | 521 |
| | store_locator_country | 1 | 670 |
| | store_locator_results_returned | 1 | 1,872 |
| | store_locator_state | 1 | 1,992 |
| | store_locator_zip | 1 | 421 |
| ComScore | page_name | 1 | 743 |
| | user_id | 1 | 1,074 |
| DoubleClick | banner_ad_name | 1 | 3 |
| Googling Analytics | affinity_group | 1 | 972 |
| | coupon_id | 1 | 2,009 |
| | rewards_member | 1 | 1,130 |
| | site_section | 1 | 663 |
| Quairoo | coupon_id | 1 | 990 |
| | products_in_cart | 1 | 772 |

FIG. 3C

Example Report 4: Tags Impacted by Page

| Tag Name | Page URL | Tags Impacted | Sessions Impacted |
|---|---|---|---|
| Adobe Analytics | www.samplesite.com/checkout/my-cart | 2 | 883 |
| | www.samplesite.com/kitchen/mixers/hand-mixers | 1 | 1,077 |
| | www.samplesite.com/store-locator | 4 | 4,955 |
| ComScore | www.samplesite.com/kitchen/cookware/pans | 1 | 743 |
| | www.samplesite.com/log-in | 1 | 1,074 |
| DoubleClick | www.samplesite.com/home | 1 | 3 |
| Google Analytics | www.samplesite.com/bath | 1 | 663 |
| | www.samplesite.com/checkout/my-cart | 1 | 2,009 |
| | www.samplesite.com/home | 1 | 1,130 |
| | www.samplesite.com/myaccount/user-preferences | 1 | 972 |
| Quatroo | www.samplesite.com/checkout/my-cart | 2 | 1,762 |

FIG. 3D

Example Report 5: Tags Blocked

| Tag Name | Tags Blocked | Sessions Impacted |
| --- | --- | --- |
| Adobe Analytics | 7 | 6,915 |
| Google Analytics | 4 | 4,774 |
| ComScore | 2 | 1,817 |
| Qualroo | 2 | 1,762 |
| DoubleClick | 1 | 3 |

FIG. 3E

Example Report 6: Tags Blocked by Page

| Tag Name | Page URL | Tags Blocked# | Sessions Impacted |
|---|---|---|---|
| Adobe Analytics | www.samplesite.com/checkout/my-cart | 2 | 883 |
| | www.samplesite.com/store-locator | 4 | 4,955 |
| | www.samplesite.com/kitchen/mixers/hand-mixers | 1 | 1,077 |
| ComScore | www.samplesite.com/kitchen/cookware/pans | 1 | 743 |
| | www.samplesite.com/log-in | 1 | 1,074 |
| DoubleClick | www.samplesite.com/home | 1 | 3 |
| Google Analytics | www.samplesite.com/checkout/my-cart | 1 | 2,009 |
| | www.samplesite.com/home | 1 | 1,130 |
| | www.samplesite.com/bath | 1 | 663 |
| | www.samplesite.com/myaccount/user-preferences | 1 | 972 |
| Qualroo | www.samplesite.com/checkout/my-cart | 2 | 1,762 |

FIG. 3F

SYSTEM AND METHOD FOR VALIDATING DATA

CROSS-REFERENCE TO RELATED APPLICATIONS

This application claims the benefit of, and priority to, U.S. Provisional Patent Application Ser. No. 62/197,439, entitled "System and Method for Validating Data," filed Jul. 27, 2015, the content of which is incorporated herein by reference in its entirety.

FIELD OF THE INVENTION

The present disclosure generally relates to a system and method for validating data.

BACKGROUND OF THE DISCLOSURE

In the digital space, organizations use a variety of technologies to track a consumer's movements as the consumer interacts with any of the digital touch points the organization may have (e.g., website, mobile application, mobile site, etc.). When a consumer arrives at a digital touch point for an organization such as a website the consumer is given a cookie, which stays with the consumer as he or she explores the various pages or layers of the digital touch point. There are a variety of JavaScript tags that may be deployed throughout the digital channel to capture information about the consumer and send that information to the organization or a third party to process the collected data and turn the data into reports. The types of consumer data that may be collected includes:

- Data from the Document Object Module (DOM);
- Visitor provided information (name, email address, etc.);
- Behavioral data (web pages viewed, applications interacted with, links clicked, etc.);
- Purchase data (items placed in cart, items purchased, etc.); and
- Campaign interactions (consumer came to website from email, by clicking on an ad on a third party website, etc.).

Deploying JavaScript tags properly so that accurate consumer information is captured and sent to the relevant party for processing requires a great amount of skill. Largely, this is a manual process completed by external consultants, internal IT teams, or a combination of the two. Most deployment implementations end up having faults due to human error as a high level of attention to detail is required to accurately adjust the JavaScript tags for each page or section of the digital touch point. As a result, organizations spend large amounts of time and money on auditing and validating implementations. Further, once the data is processed and a report generated there is often a considerable amount of time that is spent questioning the accuracy of the data or explaining why discrepancies exist.

When accurately collected, consumer data becomes inherently valuable to an organization and many business decisions are made based on the insights generated from the data. However, with all of the complications in the initial deployment implementation, maintaining that implementation over time can become a very burdensome process. Therefore, there exists a need to consistently validate data being collected and sent to an organization or third parties for processing.

SUMMARY OF THE DISCLOSURE

In an embodiment, a system may configure a specialized user computing device to validate data of a website or other digital touch point as herein described. The system may include a digital touch point associated with an organization, the digital touch point may include an element. The system may also include a quality assurance (QA) module for monitoring the digital touch point. The QA module may send a request to call if a new element is detected at the digital touch point. The system may also include a quality control (QC) algorithm associated with the QA module. The QC algorithm may receive the new element in response to the request to call and may be executed against the new element to determine if one or more discrepancies exist between current data for the new element and expected data for the new element. A tangible error report may then be generated by the QA module in response to the QC algorithm determining that discrepancies exist between current data for the new element and expected data for the new element. The error report may capture the one or more discrepancies between the current data and the data expected for the new element and the QA module may have the ability to modify the request to call to eliminate the one or more discrepancies.

In another embodiment, a tangible method may configure a specialized user computing device to validate data. The method may monitor a digital touch point, wherein the digital touch point has an element. The method may also detect the creation of a new element on the digital touch point and execute an algorithm against the new element to determine if data associated with the new element corresponds to data expected for the element. In response to a negative determination, the method may also capture one or more discrepancies between the data associated with the element and the data expected for the element in an error report, and communicate the error report to a reporting system.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

The invention may be better understood by reference to the detailed description when considered in connection with the accompanying drawings. The components in the figures are not necessarily to scale, emphasis instead being placed upon illustrating the principles of the invention. In the figures, like reference numerals designate corresponding parts throughout the different views.

FIGS. 3A-F illustrate example error reports that may be generated by the system; and, FIG. 4 illustrates an example error summary interface.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

DETAILED DESCRIPTION

The present invention now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. The following detailed description is, therefore, not to be taken in a limiting sense.

As used herein, the terms first, second, third, and the like are used to distinguish between similar elements and not necessarily for describing a specific sequential or chronological order. The terms are interchangeable under appropriate circumstances and the embodiments of the invention can operate in other sequences than described or illustrated herein.

At a high level, the described system may be useful to configure a user computing device to determine whether elements of a computer based display are corrupt and/or malicious. As users become more and more dependent of computer displays of data, there is more opportunity for unwanted data to be inserted into a display where the unwanted data may be dangerous to a computing device. An algorithm may configure a specialized user computing device using the received data. For example, the algorithm may tune the specialized user computing device to measure the risk of a data element and if the risk is over a threshold, the specialized user computing device may not display the data or may add the data or a representation of the data to a report.

Figure 1:
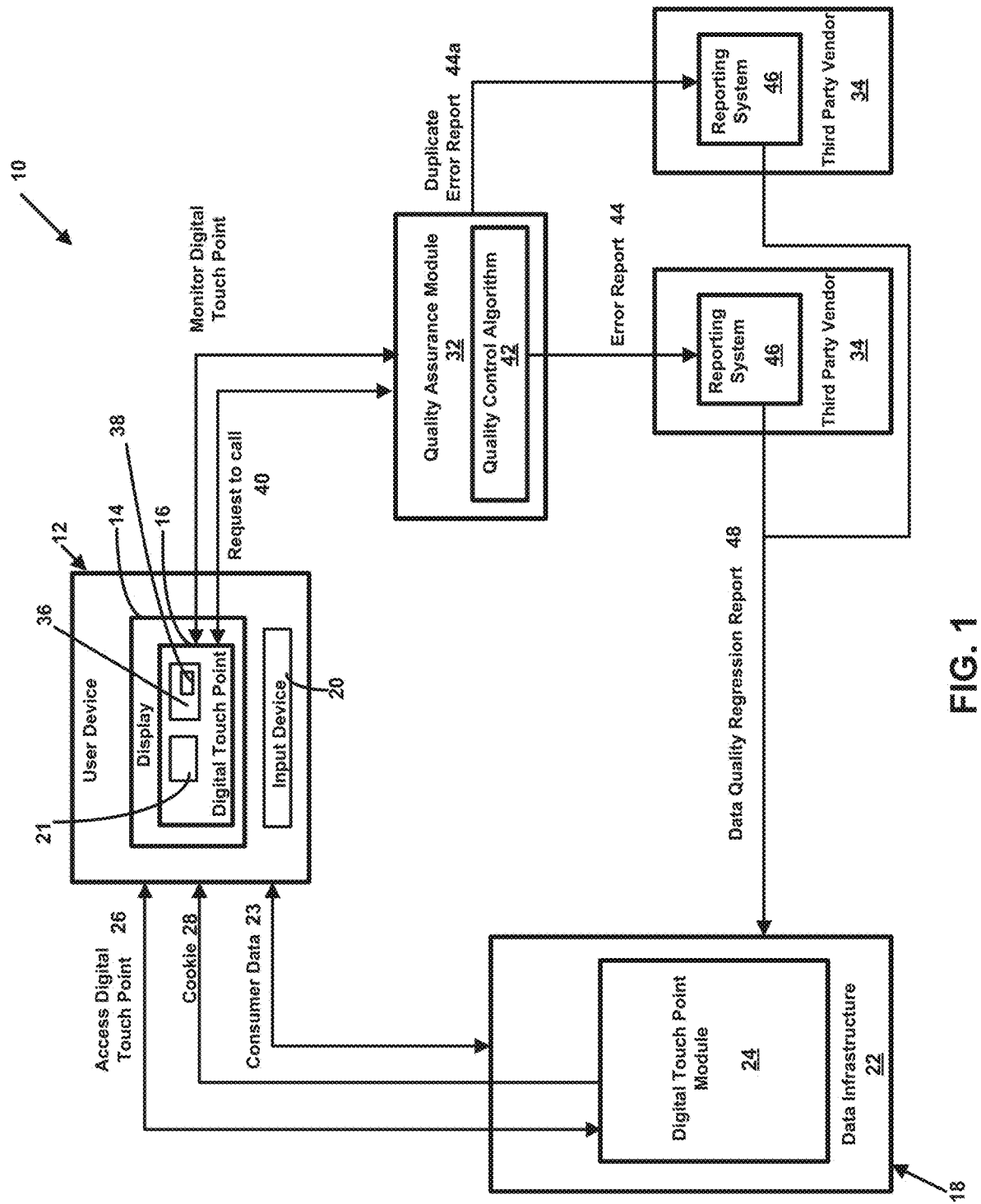
FIG. 1 is a schematic of an embodiment of a system for validating data where a reporting system is hosted by multiple third party vendors.
Figure 1A:
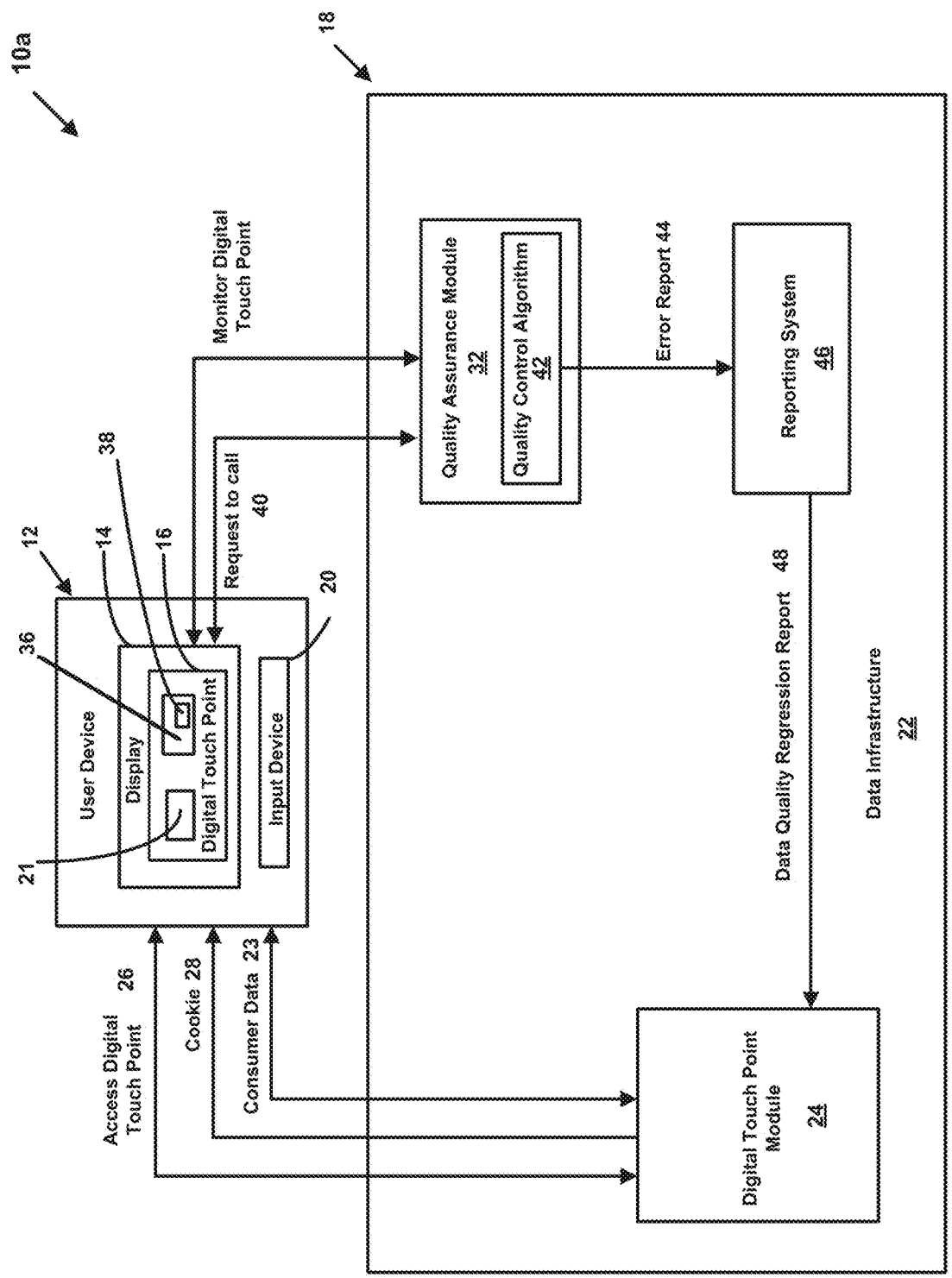
FIG. 1A is a schematic of an embodiment of the system of FIG. 1 where the reporting system is hosted within an organization.

Turning to the figures, FIGS. 1 and 1A show a system 10 and 10a, respectively, for validating data. The systems 10 and 10a may include a specialized user computing device 12 that has a display 14 for viewing a digital touch point 16 of an organization 18 and an input device 20 for interacting with the digital touch point 16. The specialized user computing device 12 may be a mobile device such as a smart phone, laptop, or tablet, a computer, or any other computing device that has an internal processor and digital display. The digital touch point 16 may be a web site, mobile application, mobile site, graphical user interface or any other manner by which the organization 18 presents information to a user digitally using the specialized user computing device 12. The digital touch point 16 may also include one or more elements 21 having data associated therewith. The elements 21 may be digital content that is digitally presented on the specialized user computing device 12. The elements 21 may be created in any appropriate computer language such as a Hypertext Markup Language (HTML) or AJAX or Flash or any other coding principle for the digital channel. The input device 20 may be a keyboard, mouse, a touch screen, or any other input device that enables a consumer to browse and interact with the digital touch point 16.

The system 10 may also include data infrastructure 22, which is associated with the organization 18 to control data used in the system 10. The data infrastructure 22 may include one or more servers, processors, and/or modules to process and store data, reports, and/or communicate various requests for data, such as a request for consumer data 23. The data infrastructure 22 may be spread out over a plurality of processors, such as in computers that are part of a network or part of a cloud computing environment. The requests may be created and implemented in a language such as JavaScript or JQuery or any other client-side language.

The data infrastructure 22 may include a digital touch point module 24, which may be used to create and control the display of the digital touch point 16. The digital touch point module 24 may communicate the digital touch point 16 to the specialized user computing device 12 in response to a request 26 to access the digital touch point 16 from the specialized user computing device 12. If a consumer provides sufficient permissions, the digital touch point module 24 may deploy one or more cookies 28 when the consumer uses the specialized user computing device 12 to communicate the request 26 to access the digital touch point 16. The digital touch point module 24 may communicate one or more requests for consumer data 23 and receive data in response. The digital touch point module 24 may also receive and process data from third party vendors 34.

The system 10 may include a quality assurance (QA) module 32. The QA module 32 may be associated with the organization 18 as shown in FIG. 1A. The QA module may contain one or more algorithms to identify/correct data quality issues with the client-side data collection modules. The QA module 32 may actively monitor the digital touch point 16 for the creation of new elements 36 on the digital touch point 16. The new elements 36 may be additional digital content components written in HTML, Flash, AJAX or other coding language. Each new element 36 may also have current data 38 associated therewith. The current data 38 of each new element 36 may include: data from the document object module (DOM); visitor provided information (name, email address, etc.); behavioral data (data indicating web pages viewed; applications interacted with, links clicked, etc.); purchase data (data indicating items placed in cart, items purchased, etc.); campaign interactions (data indicating that the consumer came to website from email, by clicking on an ad on a third party website, etc.); or other types of consumer data as described herein.

If one or more new elements 36 are detected, the QA module 32 may execute quality control (QC) algorithm 42 using the new element 36. The QC algorithm 42 may compare the current data 38 for the new element 36 with data expected for the element. The QC algorithm 42 may be customized based upon one or more inputs provided by the organization; namely, critical sections of the organization's digital presence, the types of information being collected about the user, and a prioritization of error types in the element data based upon the organization's most critical information. The QC algorithm 42 will then watch for specific instances of quality degradation in the element data and will repair (if possible) prior to the element data being sent to the third party vendor 34 and/or add the error to a report 44 (see, for example, FIGS. 3A-F) for the organization's IT team or external consultants to remedy in a prioritized manner.

For example and not limitation, JPEG image files may be expected to have certain properties and a specific format, some metadata in known file locations, but JPEGs typically do not include executable instructions. Similarly, PNG image file format may also have certain properties and a specific format that is different from a JPEG image file, some metadata in known file locations, and no executable code. Thus, for example, if a JPEG file image is newly created on the digital touch point 16, but has the format of a PNG file image, the QA module will execute the algorithm 42 against the newly created JPEG image, compare the current data for the JPEG image (i.e., the PNG format) to the data expected for the JPEG image (i.e., JPEG format), and add the error to the error report 44 or, if possible, repair the current data (i.e., change the format from PNG to JPEG) of the newly created JPEG image in real time before adding it to the error report 44.

Logically, the method and system may employ feedback to improve the algorithm 42. As an example, if the specialized user computing device 12 operates in an unexpected manner as a result of a file, the QC algorithm 42 may be updated to note that the elements 21 of similar files may be risky. Similarly, if the QC algorithm 42 configures the specialized user computing device 12 to mark the file as risky but further analysis reveals the file was not risky, the algorithm 42 may be updated to recognize the result.

Further, the method and system may be updated remotely from an authority. As malevolent users may be endlessly trying to be malicious, content and features on the digital touch point 16 may change over time. The system and method may periodically receive updates from an authority regarding new elements in a file (e.g., executable code in a PNG image file) that should be graded as being risky.

In some embodiments, the current data 38 may be given a numerical value based on the analysis of the QC algorithm 42. As an example, the element data in a file may have some suspect data or properties, which may be due to file degradation rather than being malicious and in such a case, the numerical value may be close but below a threshold. On the other hand, the element data of a file may contain data or properties, which are known to be malicious and the file may receive a score well over a threshold.

The threshold may be a default, may be set by an authority or may be determined over time by the QC algorithm 42. If the threshold is too low, many files which are not risky may be flagged. Logically, if the threshold is too high, data errors that are new or well hidden may slip through the system. The threshold may also be set through feedback where the system may watch how a specialized user computing device 12 responds to elements that were not flagged. For example, if the specialized user computing device 12 operates in an unexpected manner as a result of a file, the threshold may be lowered to catch more files. The system and method may periodically receive updates from an authority regarding the desired threshold setting.

If discrepancies exist between the current data 38 and the expected data for the element, a tangible error report 44 may be generated. If no errors are found, the report 44 may remain empty but may update in real-time to ensure completeness of the reporting. In addition, the algorithm 42 of the QA module 32 may modify the request to call 40 in real-time so that errors can be fixed immediately. The modifications implemented by the request may include changing of one or more aspects of the new element 36, for example: information about the visit/session, data values for specific actions being completed on the website, and any other data as described herein (e.g., Data from the DOM); visitor provided information such as name, email address, etc.; behavioral data such as web pages viewed, applications interacted with, links clicked, etc.; purchase data such as items placed in a digital cart, items purchased, etc.; and campaign interactions such as an indication that a consumer came to the digital touch point from email, by clicking on an ad on a third party website, etc.). The modifications implemented by the request may also include creating a new element or deleting the element 36.

The tangible error report 44 generated by the QA module 32 may be sent to one or more reporting systems 46 where the error report 44 may be stored and analyzed. If there is more than one reporting system 46, then a duplicate error report 44a may be prepared and communicated to the additional reporting systems (see FIG. 1). The error report 44 may also be stored on the organization's infrastructure or in a cloud-based system for the organization to access. The reporting system 46 may be hosted by the third party vendor 34 (see FIG. 1) or may be contained within the data infrastructure 22 of the organization 18 (see FIG. 1A).

The reporting system 46 may receive the tangible error report 44 generated by the QA module 32 and may also receive other information including information relating to new elements 36 without discrepancies. In some embodiments, the tangible error report 44 may include situations where the data was not correct or contained one of a multitude of error options. The reporting system 46 may include one or more servers and/or modules to analyze the error report 44 and other data received, and to prepare and communicate tangible reports. The reporting system 44 may prepare a data quality regression ("DQR") report 48 based on the error report 44 received as well as any other information received from the QA module 32. The DQR report 48 may then be sent to the organization 18.

The DQR report 48 may include information such as error types, the specific error, the prioritization of that error, and any other client-requested information that was incorporated into the customization of the algorithm 42 at installation. The organization 18 may use the DQR report 48 to identify errors automatically without any manual effort and ultimately put a plan in place to triage and remedy errors as they appear in the reports based on the algorithm's prioritization.

Figure 2:
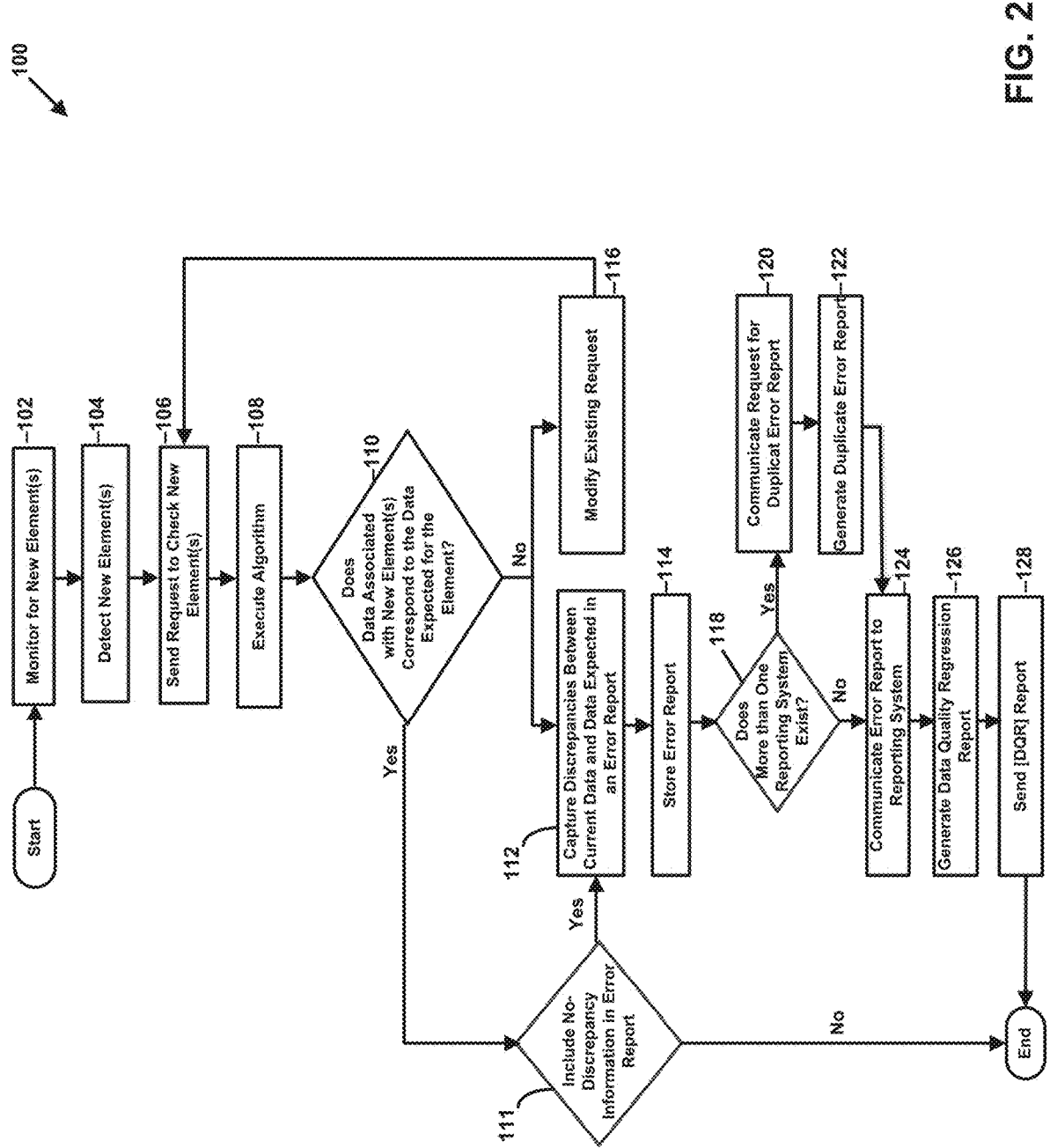
FIG. 2 is a flow chart of an embodiment of a method of validating data.

Turning to FIG. 2, a method of validating data 100 is shown. The QC algorithm 42 may include one or more of the method steps or instruction blocks, as described herein, employing and configuring the specialized user computing device 12. As described above, a user may access a digital touch point 16 of an organization using the specialized user computing device 12. Once the digital touch point 16 is launched, the QC algorithm 42 of the QA module 32 may begin monitoring the digital touch point 16 for the creation of new elements 36 at a block 102. At a block 104, the creation of a new element 36 may be detected by the QA module 32, and, in response, a request to call the new element 36 may be deployed by the QA module 32 at a block 106.

The new element 36 may be received by the QA module, and the QC algorithm 42 may be executed against the new element 36 at a block 108. As discussed above, the algorithm 42 may determine at block 110 whether the current data 38 of the new element 36 matches or corresponds to the data expected for the element.

If there are no discrepancies between the current data 38 associated with the new element 36 and the expected data for the element, then the method may proceed to a block 111. At block 111, the system will determine whether information that no discrepancies exist will be included in an error report. If the no-discrepancy information is to be captured, the method will continue to block 112. If the no-discrepancy information is not to be captured, then the method will end and operation will continue normally without interruption or change.

If there are discrepancies between the current data 38 associated with the new element 36 and the data expected for the new element, at a block 112, the discrepancies may be captured in a tangible error report 44. The tangible error report 44 may be generated by the QA module 32 and may be stored to any system designated at install at a block 114.

The QA module 32 may also modify the existing request to call 40 at a block 116. As discussed above, the modifications implemented by the request may include changing of one or more aspects of the new element 36, creating a new element, or deleting the element 36.

At a block 118, the number of reporting systems 46 may be determined. If multiple reporting systems 46 exist, a request for one or more duplicate error reports may be created and communicated at a block 120. One error report can be generated and sent to any number of reporting systems to satisfy the organization's needs without needing to run the QC algorithm 42 multiple times. At a block 122, the one or more duplicate tangible error reports 44a may be generated in response to the request.

At a block 124, the error report 44 and duplicate error reports 44a may be communicated to the appropriate reporting system(s) 46. The reporting system 46 then may process the error report 44 and may generate a DQR report 48 at block 128. As noted above, the DQR report 48 may include any errors in data collection as outlined by data concepts described herein. For example, the DQR report may include data from the document object module (DOM), visitor provided information (name, email address, etc.), behavioral data (data indicating web pages viewed, applications interacted with, links clicked, etc.), purchase data (data indicating items placed in cart, items purchased, etc.), campaign interactions (data indicating that the consumer came to website from email, by clicking on an ad on a third party website, etc.), or other types of consumer data as described herein.

The DQR report 48 may be sent to the organization 18 or a third party vendor 34 at a block 128. The DQR report 48 may be used by the organization 18 or third party vendor 34 to identify errors automatically without any manual effort and ultimately put a plan in place to triage and remedy errors as they come in based on the algorithm's prioritization.

By providing an actionable report and the ability to modify new elements in real-time, the system and methods disclosed herein enable IT personnel to fix errors immediately without having to search for them. The system and methods disclosed herein may therefore save IT personnel up to 80% of the time they spend on quality assurance issues and the associated costs for that time and effort.

FIGS. 3A-3F illustrates various example error reports 44 and duplicate error reports 44a that may be generated and sent to one or more reporting systems 46. The layout and information captured by the example error reports are for illustration purposes, and the error reports generated by the system are not limited to those shown in FIGS. 3A-3F. Further, the number and type of error report 44 generated may be customized based on the needs of the organization.

FIG. 3A shows an example error report directed to data layer errors. The data layer error report may capture discrepancies in element data and organize the error by type, such as incorrect formatting. FIG. 3B shows an example error report that may capture discrepancies in element data, but organizes them by the page URL upon which the error is detected. FIG. 3C illustrates an example error report that may depict discrepancies in element data, by the tag name impacted. FIG. 3D demonstrates an example error report that may show the page URL upon which the element data errors were found for each tag name impacted. FIG. 3E demonstrates an example error report that may show the number of tags that were blocked due to discrepencies in element data. And, FIG. 3F shows an example error report that may display the tags blocked by the page URL upon which the element data error was detected.

Figure 4:
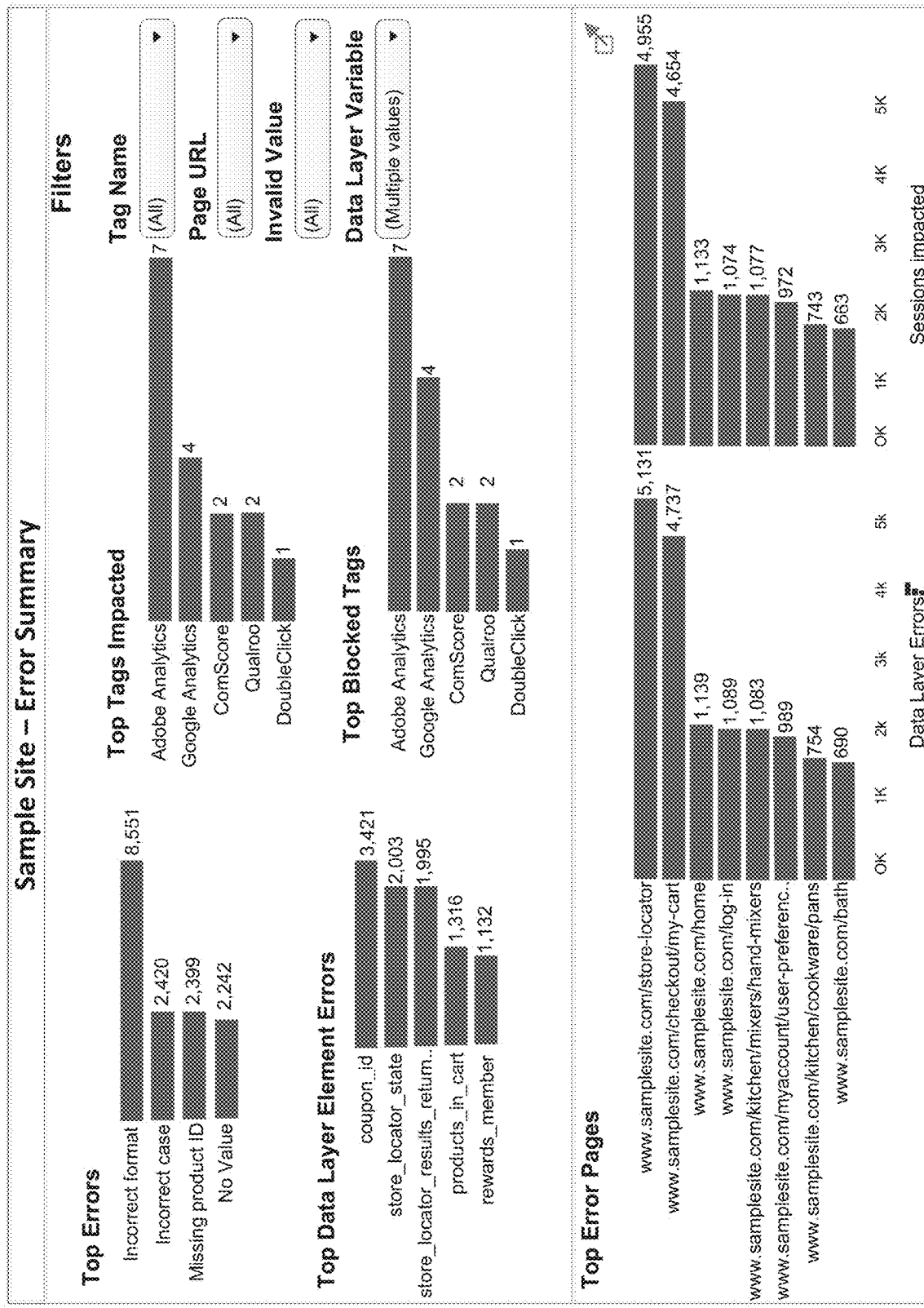

In addition to providing individual error reports, the system may also provide a summary report of the element data errors detected. The summary report may organize, rank, and graphically depict the number and type of errors detected. FIG. 4 shows an example summary report in which the summary report is presented digitally and enables the organization to filter the information presented in the error summary report as needed.

Further, the method and system may identify and correct a problem which did not even exist before wide spread use of computers and networks. The ability to identify possibly corrupt or malicious data is of growing importance but did not even exist before the advent of computers and networks.

The specialized user computing devices, computers and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated. The attached Appendix may provide more detail regarding the operation of a payment system.

The present disclosure provides a solution to the long-felt need described above. In particular, the systems and methods described herein may be configured for improving consumer data collection systems and tangible reporting of consumer data to organizations. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

We claim:

1. A system for validating consumer and organization data for a new element on a digital touch point associated with an organization, comprising:
 a memory; and
 a processor disposed in communication with said memory, and configured to execute a plurality of processing instructions stored in the memory, wherein the processor executes instructions to:
  actively monitor in real time, via a quality assurance (QA) module, the digital touch point associated with the organization as a user browses and interacts with the digital touch point, wherein the QA module validates the consumer and organization data in order to prevent errors related to the consumer and organization data as represented on the digital touch point being sent to vendors, wherein the vendors collect and process the consumer and organization data for the digital touch point;
  detect, via the QA module, the creation of the new element on the digital touchpoint, wherein the QA module automatically detects one or more discrepancies related to element data for the new element by monitoring tags embedded on the digital touch point related to the new element as the user browses and interacts with the digital touch point;
  execute a quality control (QC) algorithm associated with the QA module against the new element to determine if the one or more discrepancies exist between current data for the new element and expected data for the new element, wherein the QC algorithm is customizable based on inputs provided by the organization;
  generate, via the QA module, a tangible error report in response to the QC algorithm determining that discrepancies exist between the current data for the new element and the expected data for the new element, wherein the tangible error report captures the one or more discrepancies between the current data received and the expected data expected for the new element and organizes the one or more discrepancies by error type, error location, or tag impacted; and
  modify, via the QA module, the current data for the new element in real-time to eliminate the one or more discrepancies on the digital touch point associated with the organization, wherein modifying the QA module further comprises:
   changing the current data associated with the new element, creating another new element, or deleting the new element.

2. The system of claim 1, wherein the QA module uses the tangible error report to generate a data quality regression (DQR) report, wherein the DQR report includes information regarding the one or more discrepancies and other requested information that was incorporated into the customizable QC algorithm.

3. The system of claim 2, wherein the QA module sends the DQR report to the organization.

4. The system of claim 1, further comprising a third party, wherein the QA module communicates the tangible error report to a third party.

5. The system of claim 4, wherein the third party processes the tangible error report and generates a data quality regression (DQR) report, wherein the DQR report includes information regarding the one or more discrepancies and other requested information that was incorporated into the customizable QC algorithm.

6. The system of claim 1, further comprising: generating a summary report that organizes, ranks, and depicts a number and type of top errors detected, a number of top tags impacted, and a number of sessions impacted by the top errors for the digital touch point associated with the organization wherein the QA module sends the DQR report to the organization.

7. A processor-implemented method for validating consumer and organization data for a new element on a digital touch point associated with an organization, comprising the steps of:
    actively monitoring in real time, via a quality assurance (QA) module, the digital touch point associated with the organization as a user browses and interacts with the digital touch point, wherein the QA module validates the consumer and organization data in order to prevent errors related to the consumer and organization data as represented on the digital touch point being sent to vendors, wherein the vendors collect and process the consumer and organization data for the digital touch point;
    detecting, via the quality assurance (QA) module, the creation of a new element on the digital touch point, wherein the QA module automatically detects one or more discrepancies related to element data for the new element by monitoring tags embedded on the digital touch point related to the new element as the user browses and interacts with the digital touch point;
    executing a quality control (QC) algorithm against the new element to determine if current data associated for the new element corresponds to data expected for the new element, wherein the QC algorithm is associated with the QA module and customizable based on inputs provided by the organization;
    in response to a negative determination, generating, via the QA module, an error report that captures one or more discrepancies between the current data for the new element and the data expected for the new element in the error report and organizes the one or more discrepancies by error type, error location, or tag impacted;
    communicating, via the QA module, the error report to a reporting system; and
    modifying, via the QA module, the current data for the new element in real-time to eliminate remove the one or more discrepancies on the digital touch point associated with the organization, wherein modifying the QA module further comprises:
        changing the current data associated with the new element, creating another new element, or deleting the new element.

8. The processor-implemented method of claim 7, further comprising the step of storing the error report.

9. The processor-implemented method of claim 7, further comprising the steps of:
    generating a duplicate error report that is an identical copy of the error report; and
    communicating the duplicate error report to a second reporting system.

10. The processor-implemented method of claim 9, wherein the second reporting system is associated with a third party.

11. The processor-implemented method of claim 7, further comprising the step of generating a data quality regression (DQR) report based on the error report.

12. The processor-implemented method of claim 11, further comprising the step of communicating the DQR report to the organization.

13. The processor-implemented method of claim 7, further comprising, generating a summary report that organizes, ranks, and depicts a number and type of top errors detected, a number of top tags impacted, a number of blocked tags, and a number of sessions impacted by the top errors for the digital touch point associated with the organization wherein the step of modifying the new element to remove the one or more discrepancies comprises: (i) changing the current data associated with the new element, (ii) creating another new element, or (iii) deleting the element.

14. The system of claim 1, wherein the one or more discrepancies in the current data for the new element are of an error type, and wherein the current data is assigned a numerical value based upon the error type.

15. The system of claim 14, wherein a threshold value is set, and when the numerical value for the current data is below the threshold value the one or more discrepancies in the current data are not flagged as being malicious.

16. The system of claim 14, wherein a threshold value is set, and when the numerical value for the current data is above the threshold value the one or more discrepancies in the current data for the new element are flagged as being malicious.

17. The system of claim 1, wherein the one or more discrepancies in the tangible error report are organized based on a prioritization set by the organization.

18. The system of claim 1, wherein the vendors collect the consumer and organization data and analyzes the consumer and organization data in order to provide valuable reports for the organization regarding the digital touchpoint.

19. The processor-implemented method of claim 7, wherein the vendors collect the consumer and organization data and analyzes the consumer and organization data in order to provide valuable reports for the organization regarding the digital touchpoint.

\* \* \* \* \*